UNITED STATES PATENT OFFICE.

PHILIPP ROSKOPF, OF BROOKLYN, E. D., NEW YORK.

IMPROVEMENT IN MEDICAL COMPOUNDS FOR TREATING RINGWORM, &c.

Specification forming part of Letters Patent No. 127,925, dated June 11, 1872.

*To all whom it may concern:*

Be it known that I, PHILIPP ROSKOPF, of Brooklyn, E. D., in the county of Kings and State of New York, have invented a new and Improved Medical Compound; and I do hereby declare the following to be a full, clear, and exact description thereof, which will enable those skilled in the art to make and use the same.

This invention relates to a mixture which has been used with great advantage as a remedy for cancer, ringworm, tumors, and other diseases of a similar nature; and which consists of a solution of sulphate of zinc, sulphate of iron, sal-ammonia, and alum in water.

The proportion in which I mix the ingredients together is about as follows: Sulphate of zinc, one-half ounce; sulphate of iron, one ounce; sal-ammonia, one ounce; alum, one ounce; water, two pounds.

After the solid ingredients have completely dissolved in the water, the mixture is ready for use. It can be applied with advantage by means of a rag or sponge dipped therein and laid on the afflicted part; or, where a poultice is not applicable, my solution can be applied by means of a syringe.

The quantity of water used in the mixture may be changed according to the nature of the disease to be treated.

I have also used my compound with advantage as a remedy against sore throat, diphtheria, and similar diseases, by applying it externally, and also by using it for gargling.

What I claim as new, and desire to secure by Letters Patent, is—

A medical compound composed of the ingredients, and compounded substantially as described.

This specification signed by me this 13th day of May, 1872.

DR. PH. ROSKOPF.

Witnesses:
   W. HAUFF,
   E. F. KASTENHUBER,